United States Patent
Petersen et al.

(10) Patent No.: US 10,843,670 B2
(45) Date of Patent: Nov. 24, 2020

(54) CONTROLLING MACHINE OPERATION BASED ON SEAT ORIENTATION

(71) Applicant: Caterpillar Paving Products Inc., Brooklyn Park, MN (US)

(72) Inventors: Paul S. Petersen, Maple Grove, MN (US); Rolf af Klinteberg, Kållekärr (SE); Kyle D. Hendricks, St. Francis, MN (US); Bryan J. Downing, Champlin, MN (US); Jeremy W. Lee, Otsego, MN (US); Mathew J. Hedrington, Ham Lake, MN (US)

(73) Assignee: Caterpillar Paving Products Inc., Brooklyn Park, MN (US)

(*) Notice: Subject to any disclaimer, the term of this patent is extended or adjusted under 35 U.S.C. 154(b) by 103 days.

(21) Appl. No.: 16/034,469

(22) Filed: Jul. 13, 2018

(65) Prior Publication Data

US 2020/0017077 A1    Jan. 16, 2020

(51) Int. Cl.
*B60T 7/12*      (2006.01)
*E02F 9/20*      (2006.01)
*E02F 9/16*      (2006.01)
*E02F 9/24*      (2006.01)
*E01C 19/26*     (2006.01)

(52) U.S. Cl.
CPC .............. *B60T 7/12* (2013.01); *E02F 9/166* (2013.01); *E02F 9/2004* (2013.01); *E02F 9/2083* (2013.01); *E02F 9/24* (2013.01); *E01C 19/26* (2013.01)

(58) Field of Classification Search
CPC .. B60T 7/12; E02F 9/24; E02F 9/2083; E02F 9/2004; E02F 9/166; E01C 19/26
See application file for complete search history.

(56) References Cited

U.S. PATENT DOCUMENTS 2,931,454 A * 4/1960 Schuster ................ B60K 28/04
                                                    180/273
3,664,454 A * 5/1972 Cottrell ..................... B60T 7/06
                                                    180/273

(Continued)

FOREIGN PATENT DOCUMENTS

CN    101880999    11/2010
CN    105735092     7/2016

(Continued)

*Primary Examiner* — Darlene P Condra
(74) *Attorney, Agent, or Firm* — Schwegman, Lundberg & Woessner

(57) ABSTRACT

A work machine includes a power generator configured to generate power to propel the machine, a brake system, an operator seat, one or more sensors, and a controller. The operator seat is rotatably mounted to the machine. The one or more sensors are configured to generate one or more signals indicative of an orientation of the operator seat relative to a direction of travel of the machine. The controller is coupled to the machine and communicatively coupled to the one or more sensors. The controller is configured to determine that the operator seat is out of alignment with the direction of travel based on the one or more signals and automatically actuate the brake system if the operator seat is out of alignment with the direction of travel for more than a first threshold time.

20 Claims, 4 Drawing Sheets

(56) References Cited

U.S. PATENT DOCUMENTS

| | | | | |
|---|---|---|---|---|
| 3,787,086 | A * | 1/1974 | Cosby | B60K 1/04 296/65.07 |
| 4,019,602 | A * | 4/1977 | Habiger | B60K 28/04 180/273 |
| 4,076,302 | A * | 2/1978 | Sable | B60N 2/38 296/65.06 |
| 4,320,819 | A * | 3/1982 | Erker | B60T 7/12 180/273 |
| 4,359,121 | A * | 11/1982 | Messner | B60K 1/04 180/69.21 |
| 4,476,964 | A * | 10/1984 | Broman | B60T 7/12 180/273 |
| 4,949,820 | A * | 8/1990 | Fontaine | B60T 7/12 477/186 |
| 5,350,036 | A * | 9/1994 | Shima | B60N 2/38 180/273 |
| 5,377,777 | A * | 1/1995 | Moore | B60N 2/143 180/272 |
| 5,425,431 | A * | 6/1995 | Brandt | B60K 28/04 180/273 |
| 7,032,703 | B2 | 4/2006 | Wulfert et al. | |
| 7,121,608 | B2 | 10/2006 | Billger et al. | |
| 7,172,047 | B2 * | 2/2007 | Kidokoro | B60N 2/20 180/273 |
| 7,441,625 | B2 | 10/2008 | Ackermann | |
| 7,484,587 | B2 | 2/2009 | Portscheller et al. | |
| 7,857,086 | B2 * | 12/2010 | Wakuta | E02F 9/24 180/273 |
| 9,777,443 | B2 | 10/2017 | Bornemann et al. | |
| 2006/0113139 | A1 * | 6/2006 | Nishi | B60K 25/00 180/273 |
| 2008/0201044 | A1 * | 8/2008 | Yamada | B60K 28/04 701/50 |
| 2009/0012679 | A1 * | 1/2009 | Prasetiawan | E02F 3/964 701/50 |
| 2014/0273785 | A1 * | 9/2014 | Guillory | B60H 1/00742 454/75 |
| 2015/0204029 | A1 | 7/2015 | Bornemann et al. | |
| 2017/0088103 | A1 | 3/2017 | Klein et al. | |
| 2018/0251955 | A1 * | 9/2018 | Wynkoop | E02F 9/2025 |

FOREIGN PATENT DOCUMENTS

| | | |
|---|---|---|
| CN | 105803906 | 7/2016 |
| EP | 2374654 | 10/2011 |
| JP | 01155037 A * | 6/1989 |

* cited by examiner

CONTROLLING MACHINE OPERATION BASED ON SEAT ORIENTATION

BACKGROUND

Work machines can include controls that are configured to monitor and, in some cases, automatically control various aspects of machine operation. In some cases, work machines include controls, which, in conjunction with and/or independent of operator control, control movement of the machine. Work machine controls can control machine movement based on a number of parameters, including, for example, the orientation of an operator seat (and, by extension, the orientation of the operator disposed therein).

SUMMARY

In an example, a work machine includes a power generator configured to generate power to propel the machine, a brake system, an operator seat, one or more sensors, and a controller. The operator seat is rotatably mounted to the machine. The one or more sensors are configured to generate one or more signals indicative of an orientation of the operator seat relative to a direction of travel of the machine. The controller is coupled to the machine and communicatively coupled to the one or more sensors. The controller is configured to determine that the operator seat is out of alignment with the direction of travel based on the one or more signals and automatically actuate the brake system if the operator seat is out of alignment with the direction of travel for more than a first threshold time.

In an example, a method includes moving a work machine in a first direction. The work machine includes an operator seat rotatably mounted to the machine, one or more sensors configured to generate one or more signals indicative of an orientation of the operator seat relative to a direction of travel of the machine, and a controller. The method also includes determining, by the one or more sensors, an orientation of the operator seat relative to the first direction, determining, by a controller, that the operator seat is out of alignment with the first direction based on the one or more signals, and automatically actuating, by the controller, the brake system if the operator seat is out of alignment with the first direction for more than a first threshold time.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
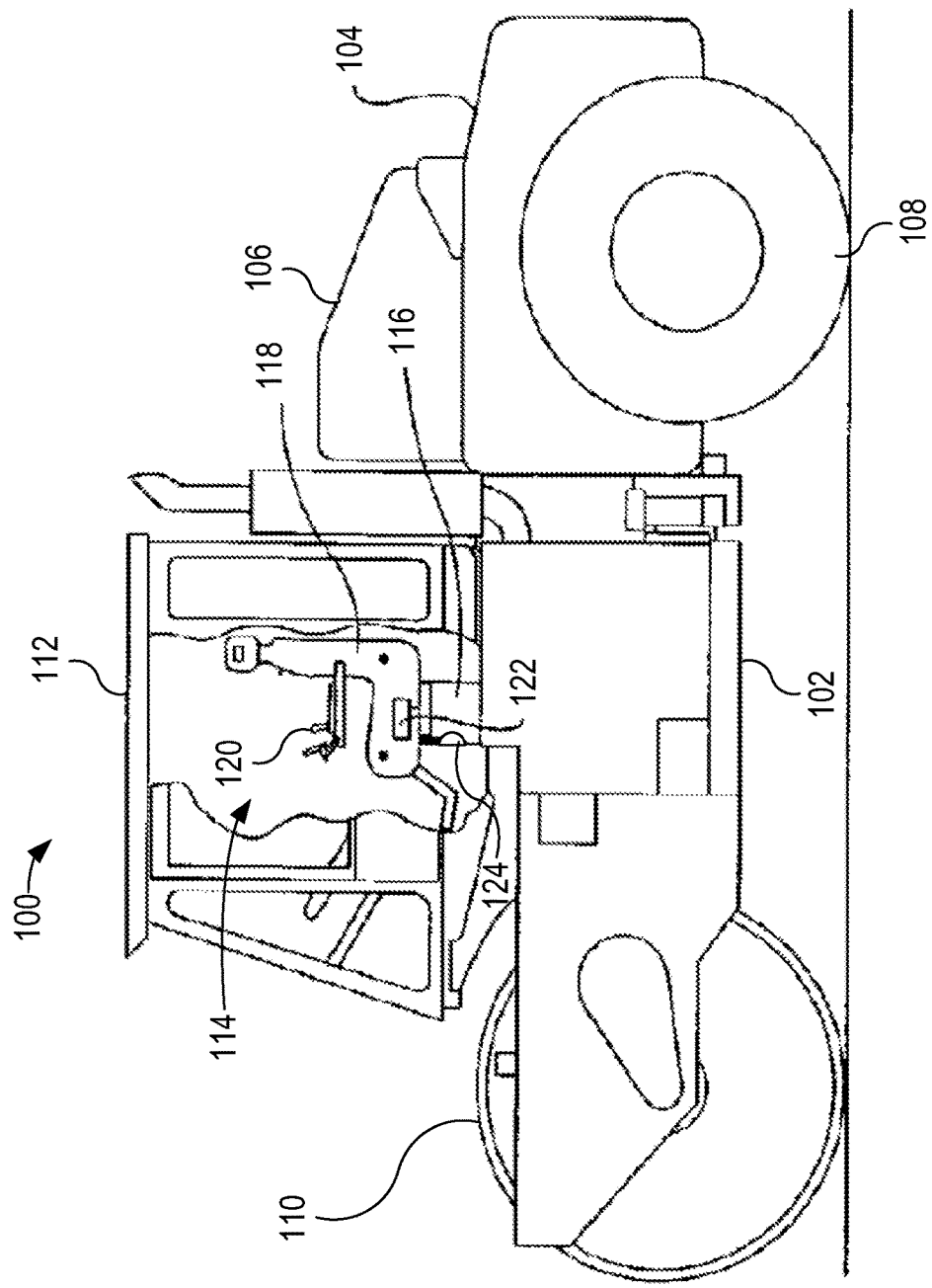
FIG. 1 depicts an example compactor work machine in accordance with this disclosure.

Some construction, industrial or other light or heavy work machines, including, for example, asphalt compactors include a rotating operator control station coupled to the machine. The operator control station commonly includes a seat in which an operator sits while operating the machine and various input/output devices which allow the operator to control and manage movement and other functions of the machine. The input/output devices can include, for example, hand controls for controlling the direction of travel of the machine, actuating and controlling one or more implements, and other control functions, as well as computer or other display devices for presenting operators with information useful to or otherwise relating to operating the machine. The hand controls and other components of the control station can be connected to and rotate with the seat. The rotating operator control station allows operators to operate the machine while facing different parts of the machine, including, for example, operating the machine while the operator and operator seat face a first end of the machine and operating the machine while the operator and operator seat face a second end of the machine, opposite the first end.

The movement of such work machines can be controlled based on, at least in part, the orientation of the operator seat relative to the machine and/or direction of travel thereof. For example, one or more control systems of the work machine can be configured to cause the machine to move in the direction a hand control of an operator control station indicates in a particular orientation of the operator seat. Hand drive controls for setting the direction of travel of the machine and for causing the machine to travel in the set direction can be connected to and rotate with the operator seat. The operator can set the drive control in a first direction, which may be, for example, toward a first end of the machine with the operator seat facing the same first end of the machine. The machine can be configured to, in this state of direction of travel controls and operator seat direction, move in the first direction, i.e. the same direction the operator is facing. The operator can then, if appropriate, stop the machine by applying the brakes, move the drive controls to a neutral position, placing the machine in an idle state, rotate the operator seat, for example, 180 degrees to face in a second direction, opposite the first, facing toward a second end of the machine, opposite the first end of the machine. The operator can once again set the drive control in the same first direction, but with the operator seat rotated 180 degrees, the drive control direction now is directed toward the second end of the machine with the operator and operator seat also facing the second end of the machine.

In such machines, the opposite ends of the machine may not be referred to as "front" or "back," because what constitutes, for example, "forward" is dependent upon the operator and operator seat orientation, which can change. The machine may be considered to move "forward," but the direction of "forward" is dictated not by whether one end or the other of the machine is leading the movement in a particular direction, but, instead on the orientation of the operator seat/control station.

In some applications, it may be a requirement of operation of some work machines that the operator be able to view what is ahead of the machine in the direction travel. As such, while the operator may be able to rotate the operator seat and control station while the machine is moving, the machine may be configured to automatically interrupt or halt movement of the machine if the operator turns the seat in a direction that is not aligned with the current direction of travel. For example, a work machine can include one or more control systems implemented in hardware, software, and combinations thereof, which are configured to automatically control movement and/or other aspects of the machine operation without intervention by or interaction from the operator.

Work machine control system(s) can be configured, for example, to automatically interrupt or halt movement of the machine when certain conditions are detected. For example, the machine control system(s) can be configured to communicate with and receive signals, data, or other information from one or more sensors configured to detect, measure, etc. one or conditions of and/or parameters related to machine operation. The control system(s) can, for example, be configured to receive signals from a rotary or orientation sensor associated with an operator seat and/or operator control station, which signals indicate the orientation of the operator seat/control station relative to the current direction of travel of the machine. In the event the control system(s) receives signal(s), data, or other information from the seat/station orientation sensor indicating the seat/station is out of alignment with the direction of travel of the machine by a threshold amount, the control system(s) may be configured to automatically apply a brake system to stop movement of the machine. As an example, the machine control system(s) may be configured to automatically stop movement of the machine when the operator seat/control station is oriented 90 degrees or more out of alignment with the direction of travel of the machine.

The present disclosure recognizes, among other things, that automated machine movement controls, e.g. the same or similar to the foregoing example, can be improved by building hysteresis into the control. For example, the machine control system(s) may be configured to automatically stop movement of the machine if the control detects (or determines, calculates, derives, etcetera) that the operator seat/control station is oriented out of alignment with the direction of travel of the machine for a threshold amount of time. Incorporating a time delay into the control method, may provide a number of advantages and/or benefits. As an example, including a time delay in an automated stop control can decrease the number of faults or errors in which the operator inadvertently rotates the seat out of alignment with the direction of travel and is capable of realigning the seat in sufficiently short enough time that it is considered permissible to allow the temporary misalignment between travel direction and operator seat/operator direction without stopping movement of the machine.

As another example, the time delay before automatically stopping machine movement may enable more efficient operation of the machine with potentially improved performance. For example, an operator of a compactor may wish to make two passes over the same material, e.g. asphalt, in two opposite directions to fully compact the material with the machine. In such circumstances, some existing machine control systems may require the operator to cause the machine to move along the material path in a first direction to the end of the path, stop the machine by applying brakes and/or placing the machine drive controls into a neutral position, rotate the seat 180 degrees to face a second direction, opposite the first direction, and then move the machine drive control into a drive gear to cause the machine to move in the second direction. The braking, drive gear controls, and seat rotation can cause the machine to sit on the asphalt (or other material) for an undesirably long period of time before commencing motion again along the path in the opposite direction.

In examples according to this disclosure, however, the operator may begin rotating their seat and view relative to direction of travel before stopping the machine and, as the machine approaches and reaches the end of one pass over the material, the operator may be positioned to reset the machine by placing the drive controls in neutral and is also immediately ready to put the machine back in gear to start traveling in the opposite direction. Enabling the operator to transition their position for operating the machine and to transition the direction of travel of the machine in such a manner can decrease the time required to process an area using the machine and can also lead to better machine performance on the material by removing previously required machine stopping time in a single position, for example, at the ends of a machine compacting run path.

In an example in accordance with this disclosure, a work machine includes a power generator, a brake system, an operator seat, one or more sensors, and a controller. The power generator provides motive power to move the machine. The brake system can provide stopping/resistive power to slow or stop the machine. The operator seat is rotatably mounted to the machine. The one or more sensors are configured to generate one or more signals indicative of an orientation of the operator seat relative to a direction of travel of the machine. The controller is configured to receive one or more signals from the one or more sensors, determine if the operator seat is out of alignment with the direction of travel based on the one or more signals, and automatically actuate the brake system if the operator seat is out of alignment with the direction of travel for more than a first threshold time.

FIG. 1 depicts example compactor work machine 100 in accordance with this disclosure. Machine 100 can be, for example, a vibratory drum compactor, which may be used to process various materials, including compacting asphalt. In FIG. 1, example machine 100 includes frame 102 to which body 104 is coupled, power generator 106, wheels 108, drum 110, and cab 112, in which operator control station 114 is arranged. Although not depicted, machine 100 also includes brakes associated with and configured to limit and/or stop rotation of wheels 108.

Work machine 100 includes frame 102, to which body 104 of the machine is attached. Frame 102 can include one or more portions and/or separate frames coupled to one another. In an example, frame 102 includes multiple frames, which are coupled to and configured to articulate relative to one another.

Machine 100 also includes power generator 106, which is configured to generate power to propel the machine and which is operatively coupled to wheels 108. Power generator 106 can include various power generation platforms, including, for example, an internal combustion engine, whether gasoline or diesel, or an electric motor. Additionally, power generator 106 will commonly be operatively coupled to one or more drive train components, including, for example, a transmission, which are configured to transmit the power generated by power generator 106 to wheels 120. In addition to propelling machine 100 over various terrains, power generated by power generator 106 can be used for various operational requirements of the machine, including operating an implement attached thereto.

Drum 110 is coupled to and configured to rotate relative to frame 102 and machine 100. Drum 110 can provide static compaction force (i.e. weight caused by gravity) to process materials, as well as can be coupled to one or more mechanisms configured to vibrate the drum and thereby provide dynamic forces to improve compaction results. Drum 110 can be a number of different sizes, materials, weights, among other characteristics, depending upon the intended use of machine 100.

Operator control station 114 is disposed within cab 112 of work machine 100. Operator control station 114 includes base 116, seat 118, hand controls 120, electronic control unit 122, and sensor(s) 124. Seat 118 can be moveably mounted on base 116, which is attached to body 104 of work machine 100, or seat 118 can be attached to base 116, which base 116 is moveably mounted to the work machine. Base 116 can be a variety of support structures that support and allow for movement of seat 118. In examples according to this disclosure, base 116 and/or seat 118 are configured to rotate relative to work machine 100, including rotating one or more complete revolutions of 360°. Seat 118 can also be configured to translate, for example, forward and backward, as well as adjust the height of the seat.

Hand controls 120 can include one or more operator input devices, which are configured to cause machine 100 to function in various modes and aspects of operation. Hand controls 120 can include a throttle, drive gear selector, or similar input, which causes machine 100 to move and/or sets the direction of travel of the machine. Hand controls 120 are connected to and rotate with seat 118. In an example, hand controls 120 include a joystick or other operator input control, which allows the operator to engage power generator 106 to propel machine 100 in a direction toward which such control is manipulated by the operator. In other examples in accordance with this disclosure, input controls to control machine operation, including movement, throttle, direction of travel, and other aspects of operation, can include input controls in addition to and/or in lieu of hand controls 120. For example, a foot peddle or other foot-actuated control could be used for machine direction, throttle, and other functions attributed to hand controls 120.

Electronic control unit (ECU) 122 is coupled to seat 118 of operator control station 114. ECU 122. Although ECU 122 is coupled to a seat 118 in the example of FIG. 1, in other examples the ECU could be positioned at different locations of operator control stations 114 or another location of machine 100. For example, ECU 122 could be positioned within base 116 or somewhere on or in body 104 of work machine 100. ECU 122 is communicatively connected to sensor(s) 124, and may also be connected to other electronic controls and/or additional sensors of machine 100.

An electronic control unit (ECU) can be an embedded system that controls machine electrical systems and/or other subsystems of the machine. Types of ECUs include Electronic/engine Control Module, Powertrain Control Module, Transmission Control Module, Brake Control Module, Suspension Control Module, among other examples. In the case of industrial, construction, and other heavy machinery, example ECUs can also include an Implement Control Module associated with one or more implements coupled to and operable from the machine.

Example machine 100 may include, for example, an Engine Control Module (ECM) associated with power generator 106, an Implement Control Module (ICM) associated with drum 110, a Transmission Control Module (TCM) associated with a transmission operatively coupled to the power generator, and a Brake Control Module (BCM) associated with the braking system of machine 100. These electronic modules/units can be communicatively connected and configured to send and receive data, sensor or other analog signals, and other information between the various ECUs of machine 100 including ECU 122. Additionally, functions attributed to ECU 122 or more generally to a controller of a work machine, can be distributed among multiple devices of machine 100, including, for example, among ECU 122 associated with operator control station 114, an ECM associated with power generator 106, and a BCM associated with the brake system of the machine.

The ECUs and other electronic controls of machine 100, including ECU 122 can include software, hardware, and combinations of hardware and software configured to execute a number of functions attributed to the components in the disclosed examples. The ECUs or other electronic controls of machine 100 can be an analog, digital, or combination analog and digital controllers including a number of components. As examples, the ECUs and other electronic controls of machine 100 can include integrated circuit boards or ICB(s), printed circuit boards PCB(s), processor(s), data storage devices, switches, relays, etcetera. Examples of processors can include any one or more of a microprocessor, a controller, a digital signal processor (DSP), an application specific integrated circuit (ASIC), a field-programmable gate array (FPGA), or equivalent discrete or integrated logic circuitry.

The ECUs and other electronic controls of machine 100 may include storage media to store and/or retrieve data or other information, for example, signals from sensors. Examples of non-volatile storage devices include magnetic hard discs, optical discs, floppy discs, flash memories, or forms of electrically programmable memories (EPROM) or electrically erasable and programmable (EEPROM) memories. Examples of volatile storage devices include random access memories (RAM), dynamic random access memories (DRAM), static random access memories (SRAM), and other forms of volatile storage devices. The data storage devices can be used to store program instructions for execution by processor(s) of, for example, ECU 122.

The ECUs and other electronic controls of machine 100 can be configured to communicate with one another and with other components of machine 100 via various wired or wireless communications technologies and components using various public and/or proprietary standards and/or protocols. Examples of transport mediums and protocols for electronic communication between components of machine 300 include Ethernet, Transmission Control Protocol/Internet Protocol (TCP/IP), 802.11 or Bluetooth, or other standard or proprietary transport mediums and communication protocols.

Operator control station 114 includes one or more sensors 124. Sensor(s) 124 is configured to, among other functions, detect rotation and, optionally, orientation of base 116 and/or seat 118 of operator control station 114. Sensor(s) 124 can include a number of types of devices configured to detect and/or measure rotation. For example, sensor(s) 124 can include magnetic reed switch(es), Hall Effect sensor(s), accelerometer(s), and magnetometer, among other example rotary/orientation sensors. Additionally, sensor(s) 124 can be devices included in other devices/systems of machine 100. In one example, sensor(s) 124 include a reed or other switch, which is positioned on seat 118 and configured to be triggered (e.g., switch from an open state to a closed state or to switch from a closed state to an open state) when the operator seat rotates out of alignment with the direction of travel of machine 100 by a threshold degree.

An operator of machine 100 can sit in seat 118 of control station 114 and can propel the machine by engaging a drive gear control of hand controls 120, releasing brakes associated with wheels 108, and, in some cases, depressing or otherwise actuating a throttle to cause power generator 106 to generate power that is transmitted through a drive train to wheels 108. In an example, ECU 122 is configured to monitor and control aspects of operation of machine 100. In an example, ECU 122 is configured to control movement of machine 100 under certain circumstances and based upon certain parameters/characteristics, which the ECU may determine, derive, calculate, measure, etcetera based on information received from other components, including, for example, sensor(s) 124.

In an example, ECU 122 is configured to receive signals periodically or continuously from sensor(s) 124. The signals of sensor(s) 124 are indicative of whether or not operator seat 118 has rotated and by what amount or the orientation into which seat 118 is rotated. ECU 122 is also configured to detect, determine and/or receive information indicative of movement of machine 100 and the direction in which the machine is moving. For example, ECU 122 can be communicatively coupled to hand controls 120 and can be configured to receive signals, data or other information indicative of various inputs of the hand controls, including a direction of travel of machine 100. Additionally or alternatively, ECU 122 can be in communication with controls or other electronics of machine 100, including, for example an ECM associated with power generator 106 and/or a TCM associated with a transmission, from which ECU 122 can receive signals or other information indicative of the state, rate, and/or direction of movement of machine 100.

In an example, an operator of machine 100 engages hand controls 120 to propel the machine. The operator can, for example, engage a joystick of hand controls 120 by pushing the joystick toward one end of machine 100 to cause the machine to move in that direction. In FIG. 1, for example, the operator may push the input control, e.g. joystick of hand controls 120 toward the end of machine 100 including drum 110 to cause machine 100 to move to the left from the perspective of the view of FIG. 1. As another example, the operator may push the input control, e.g. joystick of hand controls 120 toward the end of machine 100 including wheels 108 to cause machine 100 to move to the right from the perspective of the view of FIG. 1.

While machine 100 is moving, sensor(s) 124 samples the orientation of the operator (e.g., via the orientation of base 116 and/or seat 118) relative to a direction of travel of the machine. ECU 122 receives signals or other information from sensor(s) 124 and determines if base 116 and/or seat 118 is out of alignment with the direction of travel based on the signals received from sensor(s) 124. Additionally, ECU 122 is configured to automatically actuate a brake system of machine 100 if base 116 and/or seat 118 is out of alignment with the direction of travel for more than a first threshold time. Allowing the operator to be facing a direction other than the direction of travel for a threshold amount of time before automatically stopping movement of the machine can have a number of advantages and/or benefits to the operation and/or performance of the machine.

Figure 2A:
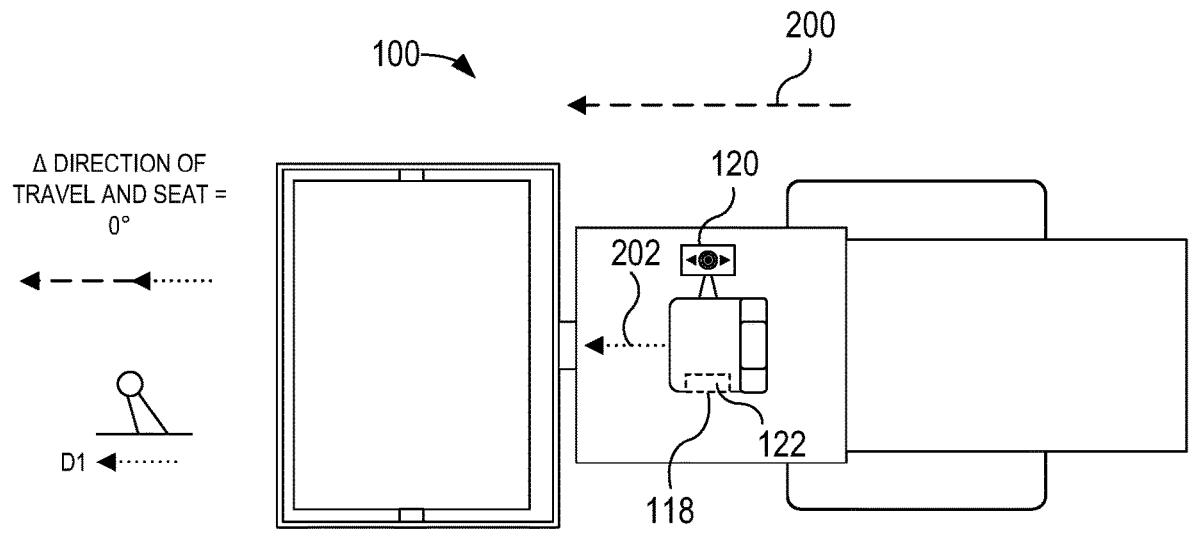
FIGS. 2A and 2B are top plan views schematically depicting the example compactor machine of FIG. 1.
Figure 2B:
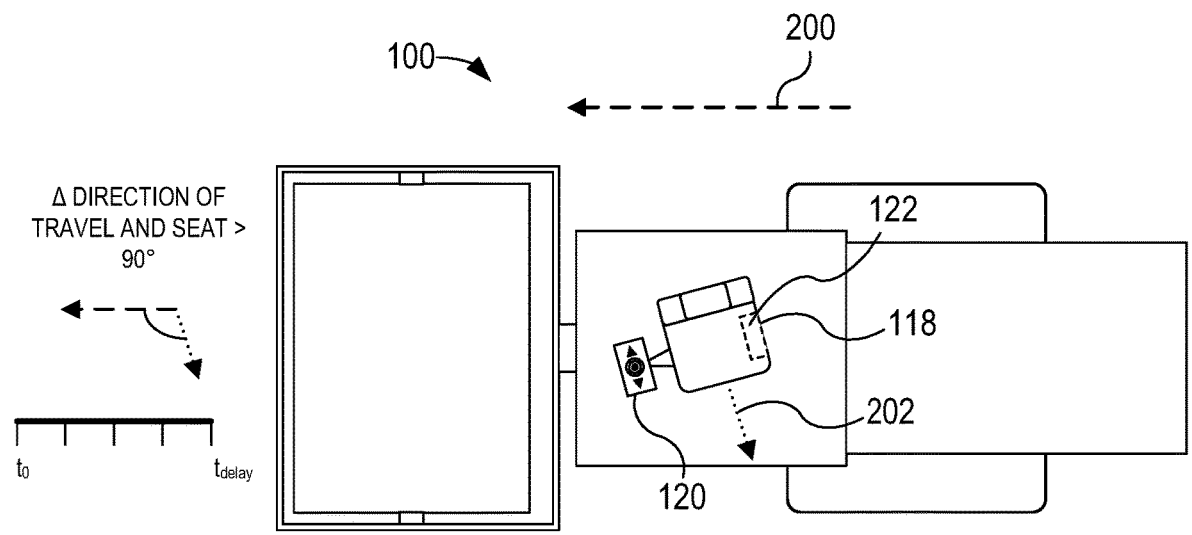

FIGS. 2A and 2B are top plan views schematically depicting machine 100 of FIG. 1. FIG. 2A depicts machine 100 moving in a first direction with operator seat 118 in a first orientation. FIG. 2B depicts machine 100 moving in the first direction with operator seat 118 in a second orientation. The direction of travel of machine 100 is indicated in FIGS. 2A and 2B by dashed line 200. The orientation of seat 118 is indicated in FIGS. 2A and 2B by the dotted line 202.

FIG. 2A depicts machine 100 moving in a first direction. In FIG. 2A, operator seat 118 and an operator disposed there is facing the first direction in which machine 100 is traveling. Additionally, direction of travel hand control 120, which is coupled to and moves with operator seat 118, is set to position D1, which places the hand control toward the first direction relative to a neutral position. The orientation (indicated by dotted line 202) of seat 118 is aligned with the direction of travel (indicated by dashed line 200) of machine 100.

In an example, an operator of machine 100 is seated in operator seat 118 and is traveling with and controlling the machine to make a pass over an area of terrain. Machine 100 can be, for example, compacting asphalt by making one or more passes over area(s) of uncompacted or not fully compacted asphalt. In FIG. 2A, the operator is controlling machine 100 with hand control 120 (and other controls/input/output devices, including, for example, an engine throttle control) to move in the first direction. As machine 100 travels over the targeted terrain, ECU 122 monitors a number of aspects of the operation of the machine, including sensor(s) or other devices generating signal(s) indicative of the state of hand control 120, the orientation of operator seat 118, and the direction of travel of machine 100.

In FIG. 2B, the operator has intentionally or unintentionally caused seat 118 to rotate to a second orientation, different than the first orientation of the seat in FIG. 2A. As described above, operator seat 118 (and, in some cases, an operator control station including the seat) is configured to rotate relative to, for example, the frame of machine 100. Control or actuation of such articulation can be caused/controlled in a number of ways. In examples, operator seat 118 is coupled to machine 100 by a mechanical mechanism that allows the seat or a base thereof to rotate when, for example, the operator actuates a lock/unlock handle or other mechanical control on or near the seat. In this manner, operator seat 118 can be manually rotated to various orientations by the operator. In other examples, operator seat 118 may be equipped with one or more motors and/or controls, which can automatically or with operator input cause the seat to rotate into/through various orientations relative to machine 100.

In FIG. 2B, operator seat 118 is out of alignment with the direction of travel of machine 100. In examples, ECU 122 is periodically or continuously receiving or requesting and receiving signals indicative of the orientation of seat 118 relative to the direction of travel of machine 100 from sensor(s), including, for example, sensor(s) 124 depicted in FIG. 1. In an example, ECU 122 may be configured to initiate one or more automated control programs/algorithms/embedded controls when operator seat 118 is oriented in any position that is out of alignment with the direction of travel. In other examples, ECU 122 may be configured to initiate automated machine controls when operator seat 118 is out of alignment with the direction of travel by a threshold degree.

In the example of FIG. 2B, operator seat 118 is out of alignment with the direction of travel of machine 100 by more than 90 degrees. In an example, ECU 122 is configured to monitor the orientation of seat 118 (e.g., using sensor(s) 124) relative to the direction of travel machine 100, which ECU 122 can determine based on signals from one or more on-board systems, including, for example, an engine control unit and/or transmission control unit. ECU 122 can also be configured to communicate with hand control 120 and to interpret the position of hand control 120 as indicative of the direction of travel of machine 100.

In the example of FIG. 2B, ECU 122 can receive signals from sensor(s) 124, which indicate that operator seat 118 is out of alignment with the direction of travel of machine 100 by equal to or greater than 90 degrees. In an example, ECU 122 determines that the misalignment between the direction of travel of machine 100 and orientation of seat 118 is greater than a predetermined threshold (e.g., 90 degrees) and initiates a timer, at to, which is configured to run for a predetermined time delay to time $t_{delay}$, as indicated by the timeline depicted in FIG. 2B. ECU 122 can be configured to take no further action in response to the misalignment of seat 118 with the direction of travel until the time delay has elapsed.

In such cases, the control program(s)/algorithm(s)/embedded control(s) included in ECU 122 can use the time delay to prevent inadvertent error conditions, for example when the operator unintentionally rotates seat 118, and provide time for the operator to align the seat with the direction of travel of machine 100 before automatically taking control of machine movement. Alternatively, machine 100 may be nearing the end of a pass over the asphalt, as the operator rotates seat 118 to the position depicted in FIG. 2B. The operator has, for example, intentionally reoriented seat 118 to prepare to transition machine 100 from traveling over the asphalt in the first direction to traveling over the asphalt in a second direction opposite of the first. In such cases, the operator can rotate seat 118 out of alignment with the direction of travel of machine 100 for equal to or less than a predetermined time, $t_{delay}$, and be ready to more smoothly and quickly transition the machine 100 to a new direction of travel without ECU 122 automatically interrupting operator control and causing the machine to stop. In the event that the time delay elapses and operator seat 118 is still 90 degrees or more (or some other predetermined threshold) out of alignment with the direction of travel of machine 100, ECU 122 can be configured to automatically slow or stop movement of the machine by, for example, automatically actuating a brake system of the machine.

Figure 3A:
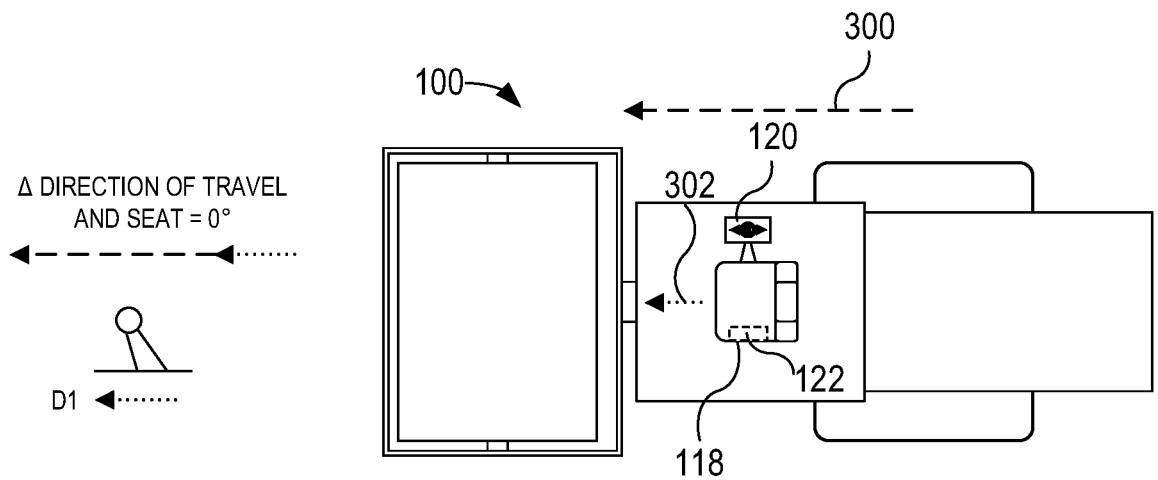
FIGS. 3A-3C are top plan views schematically depicting the example compactor machine of FIG. 1.
Figure 3B:
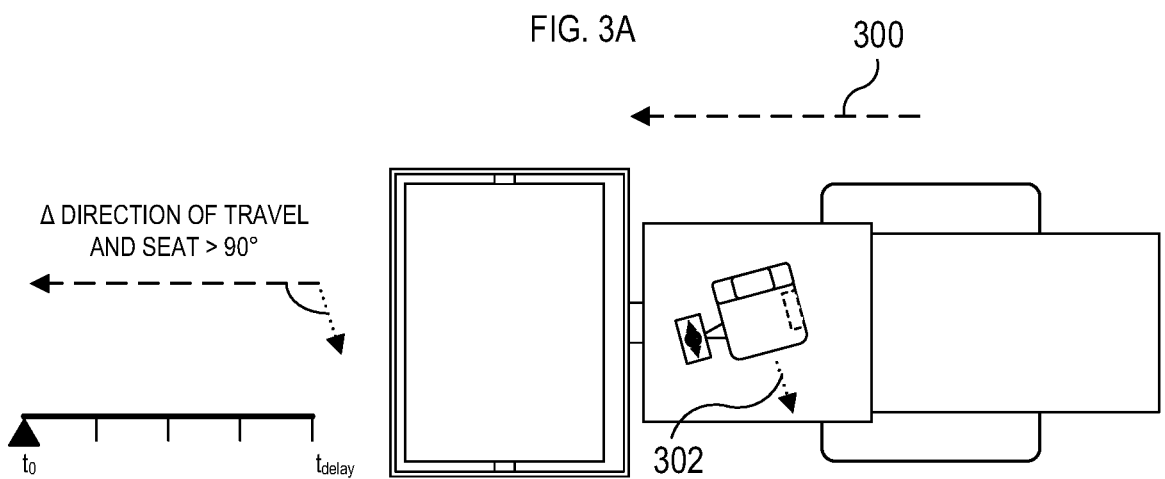
Figure 3C:
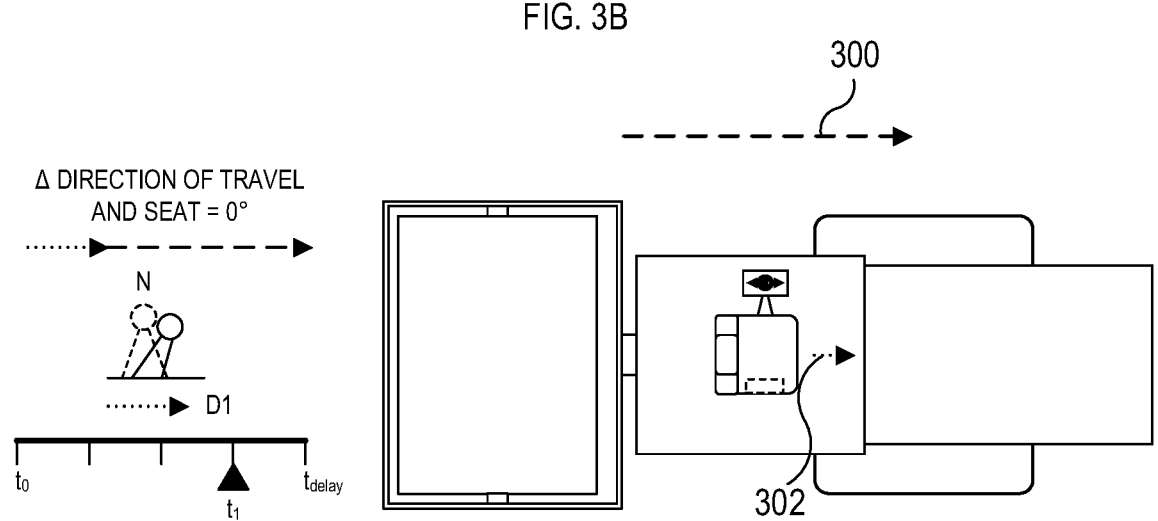

FIGS. 3A-3C are top plan views schematically depicting machine 100 of FIG. 1. FIG. 3A depicts machine 100 moving in a first direction with operator seat 118 in a first orientation. FIG. 3B depicts machine 100 moving in the first direction with operator seat 118 in a second orientation, as the operator of the machine is preparing to transition the machine from traveling the first direction to traveling a second direction opposite of the first. FIG. 3C depicts machine 100 moving in the second direction with operator seat 118 in a third orientation. The direction of travel of machine 100 is indicated in FIGS. 3A-3C by dashed line 300. The orientation of seat 118 is indicated in FIGS. 3A-3C by the dotted line 302.

FIG. 3A is similar to the example of FIG. 2A and depicts machine 100 moving in a first direction. In FIG. 3A, operator seat 118 and an operator disposed there is facing the first direction in which machine 100 is traveling. The orientation of operator seat 118 is aligned with the direction of travel, or, in other words, the delta, Δ, between the direction of travel 300 and the orientation of the seat 302 is zero. Additionally, direction of travel hand control 120, which is coupled to and moves with operator seat 118, is set to position D1, which places the hand control toward the first direction relative to a neutral position. As machine 100 travels over the target terrain, ECU 122 monitors a number of aspects of the operation of the machine, including sensor(s) or other devices generating signal(s) indicative of the state of hand control 120, the orientation of operator seat 118, and the direction of travel of machine 100.

In FIG. 3B, operator seat 118 is oriented to a second orientation and places the seat out of alignment with the direction of travel of machine 100 in the first direction by equal to or more than 90 degrees. ECU 122 periodically or continuously receives signals indicative of the orientation of seat 118 relative to the direction of travel of machine 100 from sensor(s) 124 (see FIG. 1), which are configured to measure the orientation of the seat relative to the machine. When ECU 122 receives one or more signals from sensor(s) 124 indicating that operator seat 118 is out of alignment with the direction of travel by a threshold amount (e.g., 90 degrees), ECU 122 is configured to initiate a timer at to. In FIG. 3B, although the orientation of seat 118 and the position of hand control 120 is no longer aligned with the direction of travel of machine 100, ECU 122 may not yet initiate automatic control of movement of the machine as the time delay timer is still within the threshold amount of time.

In FIG. 3C, operator seat 118 is rotated to a third orientation, which orients the seat to face the second direction of machine 100. ECU 122 continues to monitor the orientation of seat 118 relative to the direction of travel of machine 100 based upon signals from sensor(s) 124. In FIG. 3C, the timer initiated by ECU 122 is still within the predetermined time delay at time, ti. In an example, the operator is readying machine 100 to transition from traveling the first direction to traveling the second direction opposite the first.

As machine 100 approaches the end of a pass over a material targeted for processing, for example, asphalt targeted for compacting, the operator, after having rotated seat 118 out of alignment with the first direction of travel, can apply the brakes to stop the machine and may also move hand control 120 into a neutral position. In an example, ECU 122 may be configured to stop the time delay timer and to reset automated machine movement control(s) when the operator places machine 100 in this or similar neutral or idle state of movement. After stopping the machine briefly, the operator seated in seat 118 and facing the second direction of travel, can position hand control 120 in position D1, which is now set toward the second direction of travel, to cause machine 100 to move over and compact the asphalt in the second direction. In this or similar manner, the operator can smoothly and quickly transition machine 100 from traveling over the asphalt in the first direction to traveling over the asphalt in the second direction.

The foregoing examples have been described with reference to a drum compactor work machine 100. However, examples according to this disclosure are applicable to a variety of types of work machines, including graders, scrapers, dozers, and excavators, as examples.

Figure 4:
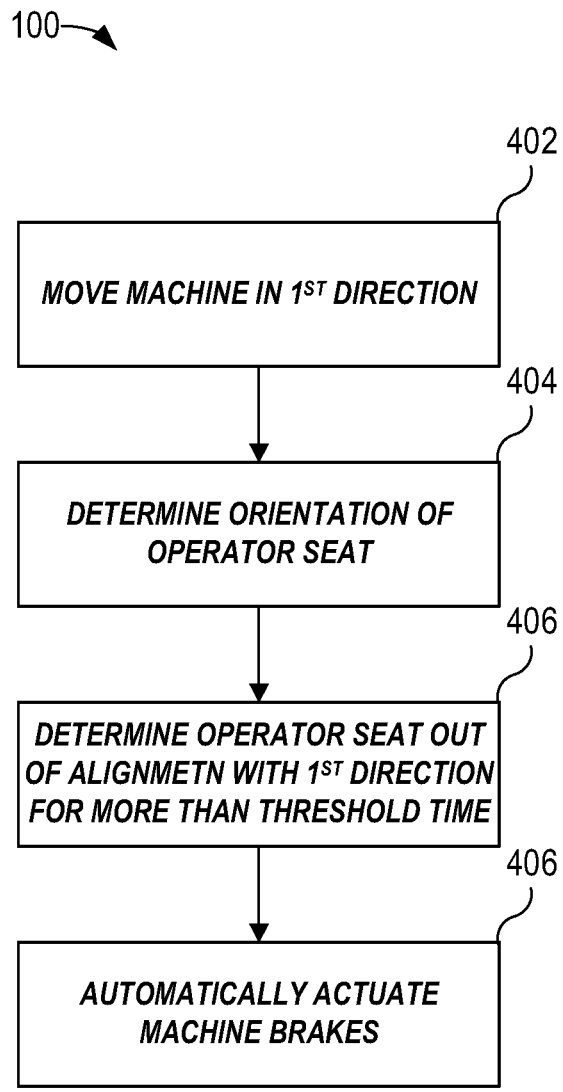
FIG. 4 is a flowchart depicting an example method of operating a work machine in accordance with this disclosure.

FIG. 4 is a flowchart depicting an example method of operating a work machine in accordance with this disclosure. In FIG. 4, method 400 includes moving a work machine in a first direction (402), determining an orientation of an operator seat relative to the first direction (404), determining that the operator seat is out of alignment with the first direction (406), and automatically actuating machine brakes if the operator seat is out of alignment with the first direction for more than a first threshold time (408).

In an example, the work machine includes a power generator configured to generate power to propel the machine, a brake system, an operator seat rotatably mounted to the machine, and one or more sensors, and a controller. The sensor(s) are configured to generate signals indicative of an orientation of the operator seat relative to a direction of travel of the machine.

The controller is communicatively coupled to the one or more sensors and can be an electronic control unit (ECU) or multiple electronic controls of the machine. The sensor(s) are configured to determine the orientation of the operator seat relative the first direction in which the machine is moving. The controller is configured to determining that the operator seat is out of alignment with the first direction based on signals received from the sensor(s). The controller is also configured to automatically actuate the brake system if the operator seat is out of alignment with the first direction for more than a first threshold time.

In an example, the controller is configured to determine whether or not the operator seat is out of alignment with the first direction by a threshold degree. For example, the controller can monitor the signals received from the sensor(s) to detect signals indicative of the operator seat rotating 90 degrees or more out of alignment with the direction of travel of the machine.

In an example, the controller is configured to receive the signals from the sensor(s) indicative of the orientation of the operator seat relative to the direction of travel of the machine, the first direction in the example of FIG. 4. The controller can be configured to determine that the operator seat is out of alignment (any misalignment or misalignment by a threshold degree) with the direction of travel based on the signal(s) from the sensor(s). Upon or some other time after determining that the seat is out of alignment, the controller can be configured to start an electronic timer configured to run for a threshold amount of time. The threshold amount of time can be, for example, an predetermined time delay within which it is deemed acceptable to have the operator/operator seat out of alignment with the direction of travel based on the operating conditions or environment. The controller can also determine that the operator seat is out of alignment with the direction of travel upon the timer reaching the first threshold time, and, upon or sometime after the timer running out, automatically actuate the brake system to stop the machine moving in the first direction.

INDUSTRIAL APPLICABILITY

In an example in accordance with this disclosure, an operator operates a drum compactor to process an area of asphalt. The drum compactor includes an operator seat, in which the operator is seated. The operator seat can be rotated by the operator to multiple positions/orientations relative to the direction in which the machine is traveling. The operator can propel the machine with a throttle control, set the direction of travel with a drive control, and manually slow or stop movement of the machine with a brake pedal or other input control.

The operator positions the machine to make a first pass over the uncompacted/unprocessed asphalt. The operator sets the drive control to a first position, in which the control is disposed toward the intended direction of travel of the machine. The operator may release the machine brakes and actuate the throttle to move the machine over the asphalt in a first compaction pass.

As the machine compacts the asphalt on the first pass, an electronic control unit monitors, among other parameters/characteristics of machine operation, the direction of travel, the orientation of the operator seat, and state and/or rate of travel of the machine. The machine progress along and nears the end of the first pass over the asphalt with the operator controlling movement.

As the machine reaches the end of the first pass, the operator begins to rotate the seat, e.g. by releasing a rotary lock on the seat base, to be positioned to transition the machine from the first pass in the first direction to a second pass over the asphalt in a second direction, different than and, in some cases, opposite to the first direction. The operator can, for example, rotate the seat to 90 degrees or slightly more out of alignment with the first direction of the first pass. The machine is still moving through the first pass in this first direction. However, the operator, at this position, may be able to pivot (e.g. turn head) to see both the current first direction of travel and also the second anticipated next direction of travel.

The controller of the machine monitors and detects the rotation of the seat by the operator. Upon detecting, determining, deriving, etc. that the seat has rotated out of alignment with the direction of travel by, for example, 90 degrees or more, the controller initiates a timer configured to run for a predetermined amount of time, within which it is deemed acceptable to have the operator/seat out of alignment with the direction of travel. In the event that the timer elapses and the operator seat is still 90 degrees or more (or some other predetermined threshold) out of alignment with the direction of travel of the machine, as indicated by signals received by the controller from one or more sensors measuring or otherwise tracking the orientation of the seat, the controller can be configured to automatically slow or stop movement of the machine by, for example, automatically actuating machine brakes.

However, before the timer elapses, the machine reaches the end of the first pass, at which time the operator places the machine drive controls in a neutral position, releases the throttle control, and/or actuates the brakes to stop the machine at the end of the first pass. If not already facing the second direction, the operator positions the seat in a second orientation, which is aligned with the second direction of travel of the machine and employs the drive control, throttle, and/or brakes to cause the machine to take a second compaction pass over the asphalt in the second direction, which is different than and may be opposite to the first direction. In this manner, the operator is able to smoothly and more quickly transition the machine from the first pass over the asphalt to the second pass including rotating the operator seat out of alignment with and therefore not facing the direction of travel for a predetermined amount of time.

Various examples are illustrated in the figures and foregoing description. One or more features from one or more of these examples may be combined to form other examples.

The above detailed description is intended to be illustrative, and not restrictive. The scope of the disclosure should, therefore, be determined with references to the appended claims, along with the full scope of equivalents to which such claims are entitled.

What is claimed is:

1. A work machine comprising:
  a power generator configured to generate power to propel the machine;
  a brake system;
  an operator seat rotatably mounted to the machine; and
  one or more sensors configured to generate one or more signals indicative of an orientation of the operator seat relative to a direction of travel of the machine; and
  a controller coupled to the machine and communicatively coupled to the one or more sensors, the controller configured to:
    determine that the operator seat is out of alignment with the direction of travel based on the one or more signals; and
    automatically actuate the brake system if the operator seat is out of alignment with the direction of travel for more than a first time delay.

2. The work machine of claim 1, further comprising an operator control station comprising:
  the operator seat;
  the one or more sensors; and
  a drive control configured to control at least one of a rate and a direction of travel of the machine.

3. The work machine of claim 2, wherein the drive control comprises at least one input control device configured to be disposed in a plurality of positions to control the direction of travel of the machine.

4. The work machine of claim 3, wherein the controller is communicatively coupled to the input control device, the controller being configured to:
receive one or more signals from the input control device indicative of a position in which the input control device is disposed; and
determine the direction of travel of the machine based at least in part on the position in which the input control device is disposed.

5. The work machine of claim 2, wherein the drive control is connected to and configured to move with the operator seat.

6. The work machine of claim 1, wherein the controller is configured to automatically actuate the brake system if the operator seat is out of alignment with the direction of travel by a threshold degree for more than the first time delay.

7. The work machine of claim 1, wherein the controller is configured to:
determine if the operator seat is 90 degrees or more out of alignment with the direction of travel based on the one or more signals; and
automatically actuate the brake system if the operator seat is 90 degrees or more out of alignment with the direction of travel for more than the first time delay.

8. The work machine of claim 1, wherein the controller is configured to:
receive the one or more signals from the one or more sensors;
determine that the operator seat is out of alignment with the direction of travel based on the one or more signals;
start a timer configured to run for the first time delay;
determine that the operator seat is out of alignment with the direction of travel upon the timer reaching the first time delay; and
automatically actuate the brake system.

9. The work machine of claim 8, wherein determining that the operator seat is out of alignment with the direction of travel comprises determining that the operator seat is out of alignment with the direction of travel by a threshold degree.

10. The work machine of claim 9, determining that the operator seat is out of alignment with the direction of travel by a threshold degree comprises determining that the operator seat is 90 degrees or more out of alignment with the direction of travel.

11. The work machine of claim 8, wherein the controller is configured to determine the direction of travel of the machine based on at least one of:
one or more signals from a drive control of the machine and one or more signals from an electronic control unit (ECU) of the machine.

12. The work machine of claim 11, wherein the electronic control unit comprises at least one of an engine control module associated with the power generator and a transmission control module associated with a transmission operatively coupled to the power generator.

13. The work machine of claim 1, wherein the controller comprises an electronic control unit, the electronic control unit being at least one of an engine control module associated with the power generator and a transmission control module associated with a transmission operatively coupled to the power generator.

14. The work machine of claim 1, wherein the one or more sensors comprise at least one of an accelerometer, a reed switch, a Hall Effect sensor, and a magnetometer.

15. A work machine comprising:
means for moving the machine;
means for stopping the machine;
an operator seat rotatably mounted to the machine;
means for determining an orientation of the operator seat relative to a direction of travel of the machine;
means for determining that the operator seat is out of alignment with the direction of travel based on one or more signals from the means for determining an orientation; and
means for automatically actuating the means for stopping if the operator seat is out of alignment with the direction of travel for more than a first time delay.

16. The work machine of claim 15, wherein the means for determining an orientation of the operator seat relative to a direction of travel of the machine comprises at least one of an accelerometer, a reed switch, a Hall Effect sensor, and a magnetometer.

17. The work machine of claim 15, wherein at least one of the means for determining that the operator seat is out of alignment with the direction of travel and the means for automatically actuating the brake system comprises an electronic control unit, the electronic control unit being at least one of an engine control module and a transmission control module.

18. A method comprising:
moving a work machine in a first direction, the work machine comprising:
an operator seat rotatably mounted to the machine; and
one or more sensors configured to generate one or more signals indicative of an orientation of the operator seat relative to a direction of travel of the machine; and
a controller;
determining, by the one or more sensors, an orientation of the operator seat relative to the first direction;
determining, by a controller, that the operator seat is out of alignment with the first direction based on the one or more signals; and
automatically actuating, by the controller, the brake system if the operator seat is out of alignment with the first direction for more than a first time delay.

19. The method of claim 18, wherein determining, by a controller, that the operator seat is out of alignment with the first direction comprises determining, by the controller, that the operator seat is out of alignment with the first direction by a threshold degree.

20. The method of claim 18, wherein determining, by a controller, that the operator seat is out of alignment with the first direction comprises:
receiving the one or more signals from the one or more sensors;
determining that the operator seat is out of alignment with the direction of travel based on the one or more signals;
starting a timer configured to run for the first threshold time; and
determining that the operator seat is out of alignment with the direction of travel upon the timer reaching the first threshold time.

* * * * *